(12) United States Patent
Yuan et al.

(10) Patent No.: US 9,237,535 B2
(45) Date of Patent: Jan. 12, 2016

(54) CHANNEL ESTIMATION IN WIRELESS NETWORKS

(71) Applicant: QUALCOMM Incorporated, San Diego, CA (US)

(72) Inventors: Rebecca W. Yuan, San Diego, CA (US); Raghu N. Challa, San Diego, CA (US); Yuanning Yu, Fremont, CA (US); Michael L. McCloud, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 237 days.

(21) Appl. No.: 13/788,170

(22) Filed: Mar. 7, 2013

(65) Prior Publication Data

US 2013/0235818 A1 Sep. 12, 2013

Related U.S. Application Data

(60) Provisional application No. 61/609,167, filed on Mar. 9, 2012.

(51) Int. Cl.
| | |
|---|---|
| *H04W 56/00* | (2009.01) |
| *H04L 25/02* | (2006.01) |
| *H04L 5/00* | (2006.01) |
| *H04L 5/14* | (2006.01) |

(52) U.S. Cl.
CPC .............. *H04W 56/00* (2013.01); *H04L 5/0023* (2013.01); *H04L 25/0202* (2013.01); *H04L 25/0228* (2013.01); *H04L 5/0048* (2013.01); *H04L 5/1469* (2013.01); *H04L 25/0212* (2013.01)

(58) Field of Classification Search
CPC .............. H04W 56/00; H04L 25/0202; H04L 25/0228; H04L 25/0212; H04L 5/0023; H04L 5/0048; H04L 5/1469
See application file for complete search history.

(56) References Cited

U.S. PATENT DOCUMENTS

| | | | |
|---|---|---|---|
| 8,416,759 B1 * | 4/2013 | Narasimhan et al. | 370/344 |
| 8,503,946 B2 * | 8/2013 | Lindoff et al. | 455/67.13 |
| 2009/0285327 A1 * | 11/2009 | Iwai et al. | 375/295 |
| 2009/0318090 A1 * | 12/2009 | Flordelis et al. | 455/67.13 |
| 2010/0103892 A1 * | 4/2010 | Abrahamsson et al. | 370/329 |
| 2011/0286499 A1 * | 11/2011 | Panicker et al. | 375/148 |
| 2012/0307772 A1 | 12/2012 | Kwon et al. | |
| 2012/0314588 A1 * | 12/2012 | Nammi | 370/252 |
| 2012/0320841 A1 | 12/2012 | Miki et al. | |
| 2013/0010723 A1 | 1/2013 | Ouchi et al. | |
| 2013/0114441 A1 * | 5/2013 | Yoo et al. | 370/252 |

FOREIGN PATENT DOCUMENTS

WO   WO-2010050757 A2   5/2010

OTHER PUBLICATIONS

International Search Report and Written Opinion—PCT/US2013/029755—ISA/EPO—Jun. 27, 2013.

* cited by examiner

*Primary Examiner* — Clemence Han
(74) *Attorney, Agent, or Firm* — Patterson & Sheridan, L.L.P.

(57) ABSTRACT

Aspects of the present disclosure generally relate to wireless communications and, more particularly, to performing channel estimation with modifications for improved system performance. Aspects generally include receiving, at a user equipment (UE), reference signals from a base station in a current subframe, and performing channel estimation, wherein the channel estimation is based at least in part on the reference signals received in the current subframe, a mobility characteristic of the UE, and a configuration of subframes prior to the current subframe.

28 Claims, 14 Drawing Sheets

800

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D | ed. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

CHANNEL ESTIMATION IN WIRELESS NETWORKS

CLAIM OF PRIORITY UNDER 35 U.S.C. §119

The present Application for Patent claims benefit of U.S. Provisional Patent Application Ser. No. 61/609,167, filed Mar. 9, 2012 and assigned to the assignee hereof and hereby expressly incorporated by reference herein.

TECHNICAL FIELD

The present disclosure relates generally to communication systems, and more particularly, to method and apparatus for enabling non-destaggered channel estimation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method for wireless communications is provided. The method generally includes receiving, at a user equipment (UE), reference signals from a base station in a current subframe, and performing channel estimation, wherein the channel estimation is based at least in part on the reference signals received in the current subframe, a mobility characteristic of the UE, and a configuration of subframes prior to the current subframe.

In an aspect of the disclosure, an apparatus for wireless communications is provided. The apparatus generally includes means for receiving, at a user equipment (UE), reference signals from a base station in a current subframe, and means for performing channel estimation, wherein the channel estimation is based at least in part on the reference signals received in the current subframe, a mobility characteristic of the UE, and a configuration of subframes prior to the current subframe.

In an aspect of the disclosure, an apparatus for wireless communications is provided. The apparatus generally includes at least one processor and a memory coupled to the at least one processor. The at least one processor is generally configured to receive, at a user equipment (UE), reference signals from a base station in a current subframe, and perform channel estimation, wherein the channel estimation is based at least in part on the reference signals received in the current subframe, a mobility characteristic of the UE, and a configuration of subframes prior to the current subframe.

In an aspect of the disclosure, a computer-program product for wireless communications is provided. The computer-program product generally includes a computer-readable medium having code for receiving, at a user equipment (UE), reference signals from a base station in a current subframe, and performing channel estimation, wherein the channel estimation is based at least in part on the reference signals received in the current subframe, a mobility characteristic of the UE, and a configuration of subframes prior to the current subframe.

DETAILED DESCRIPTION

Figure 1:
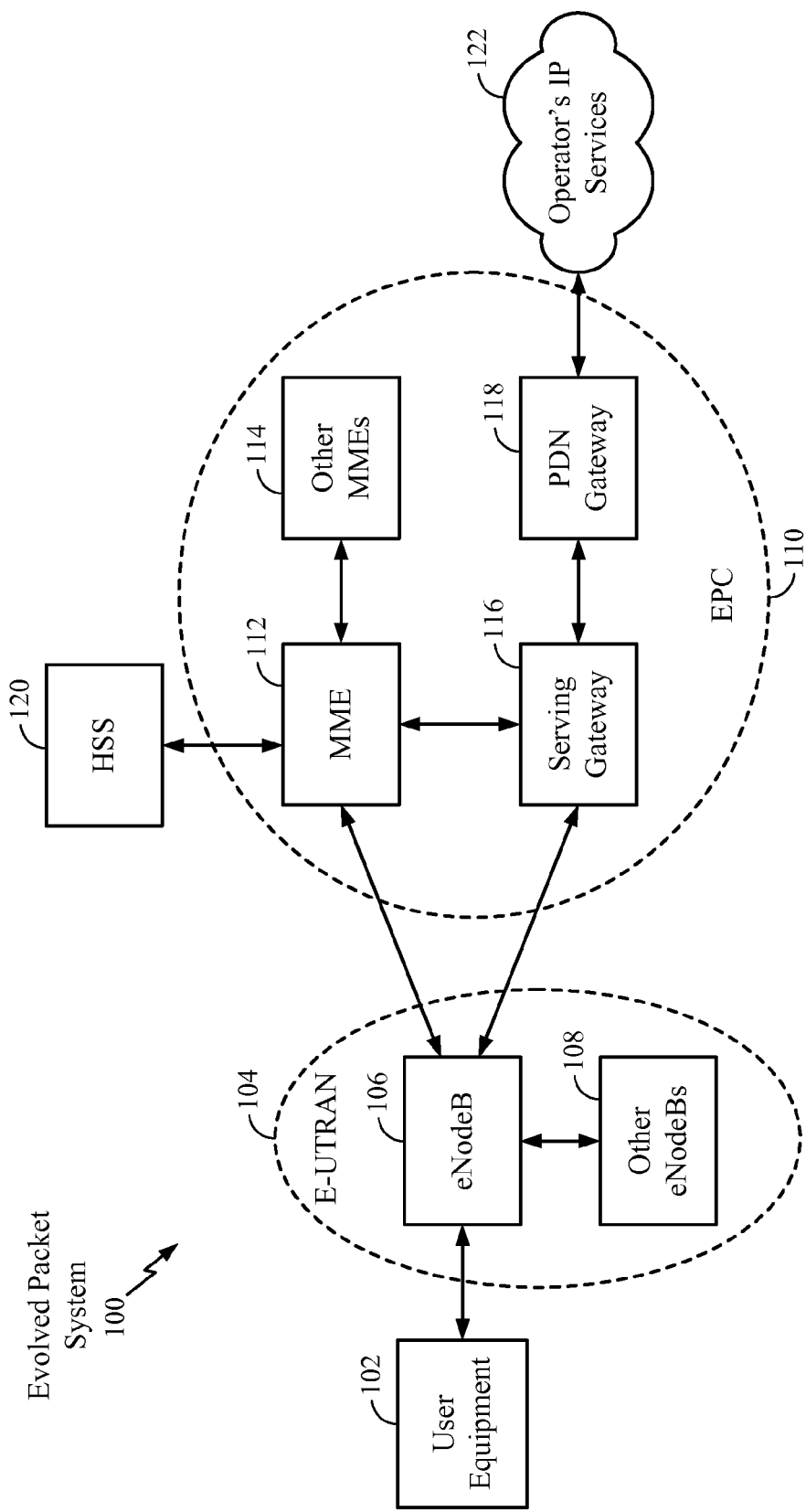
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an example LTE network architecture 100 in which aspects of the present disclosure may be practiced.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
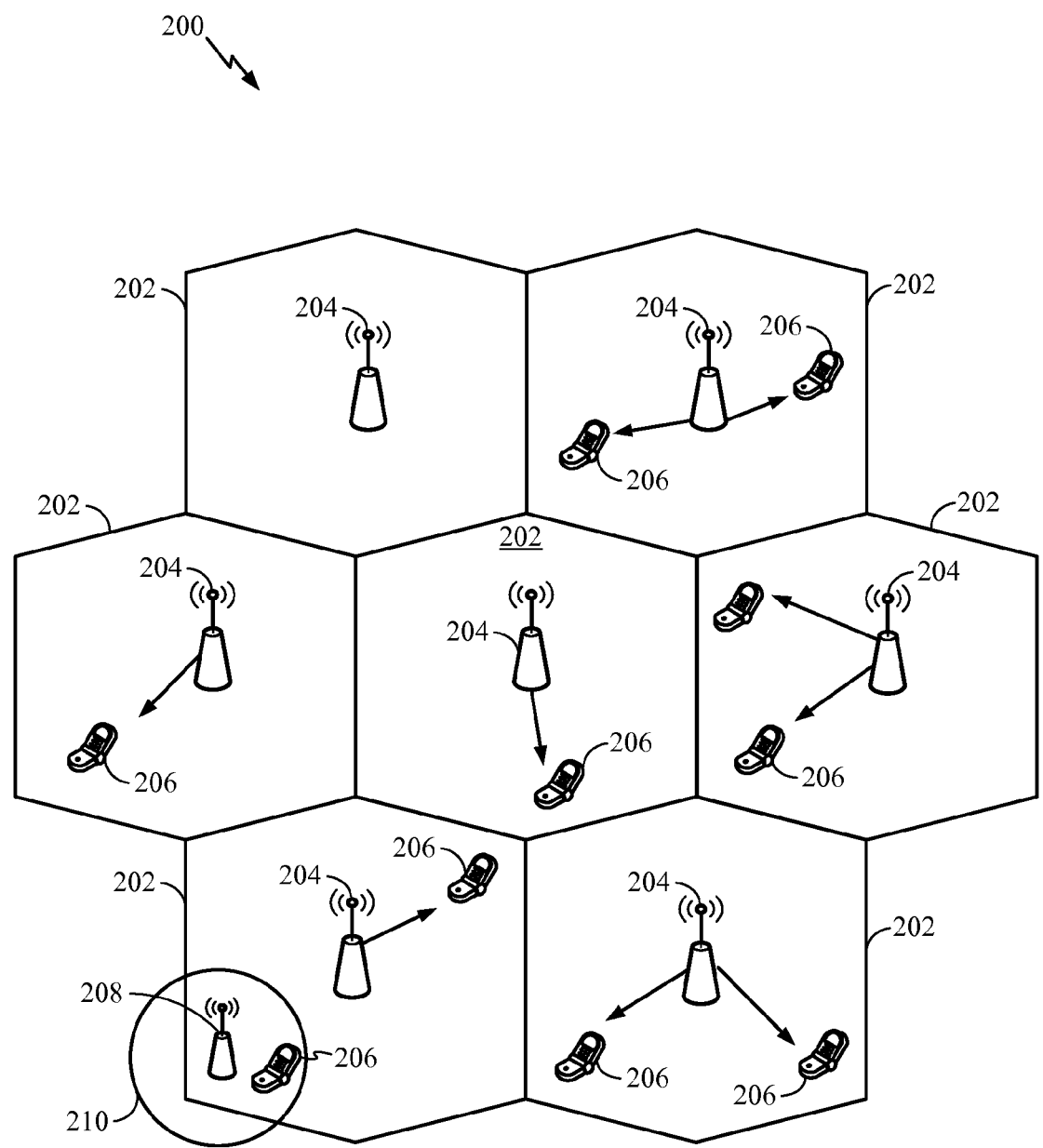
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
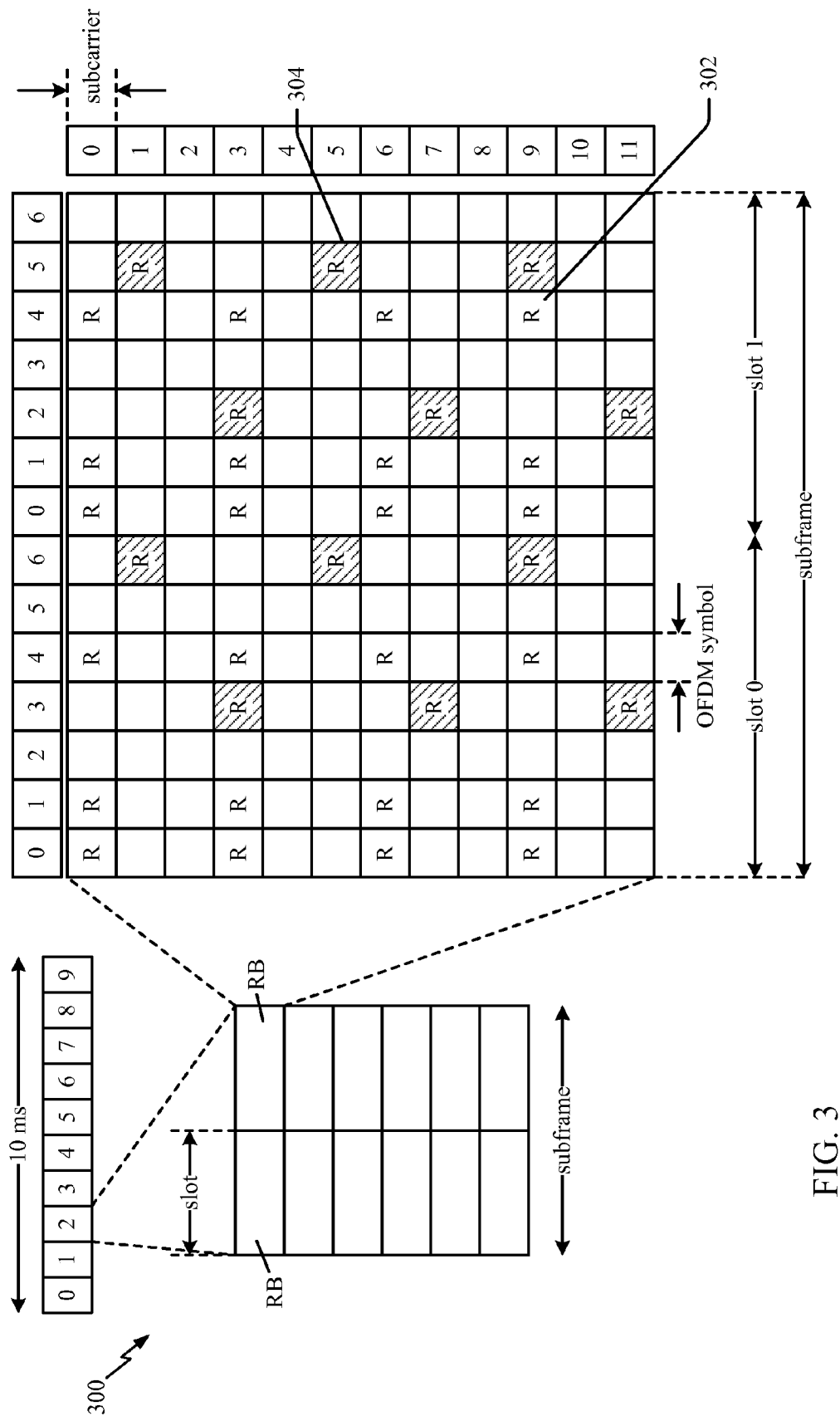
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
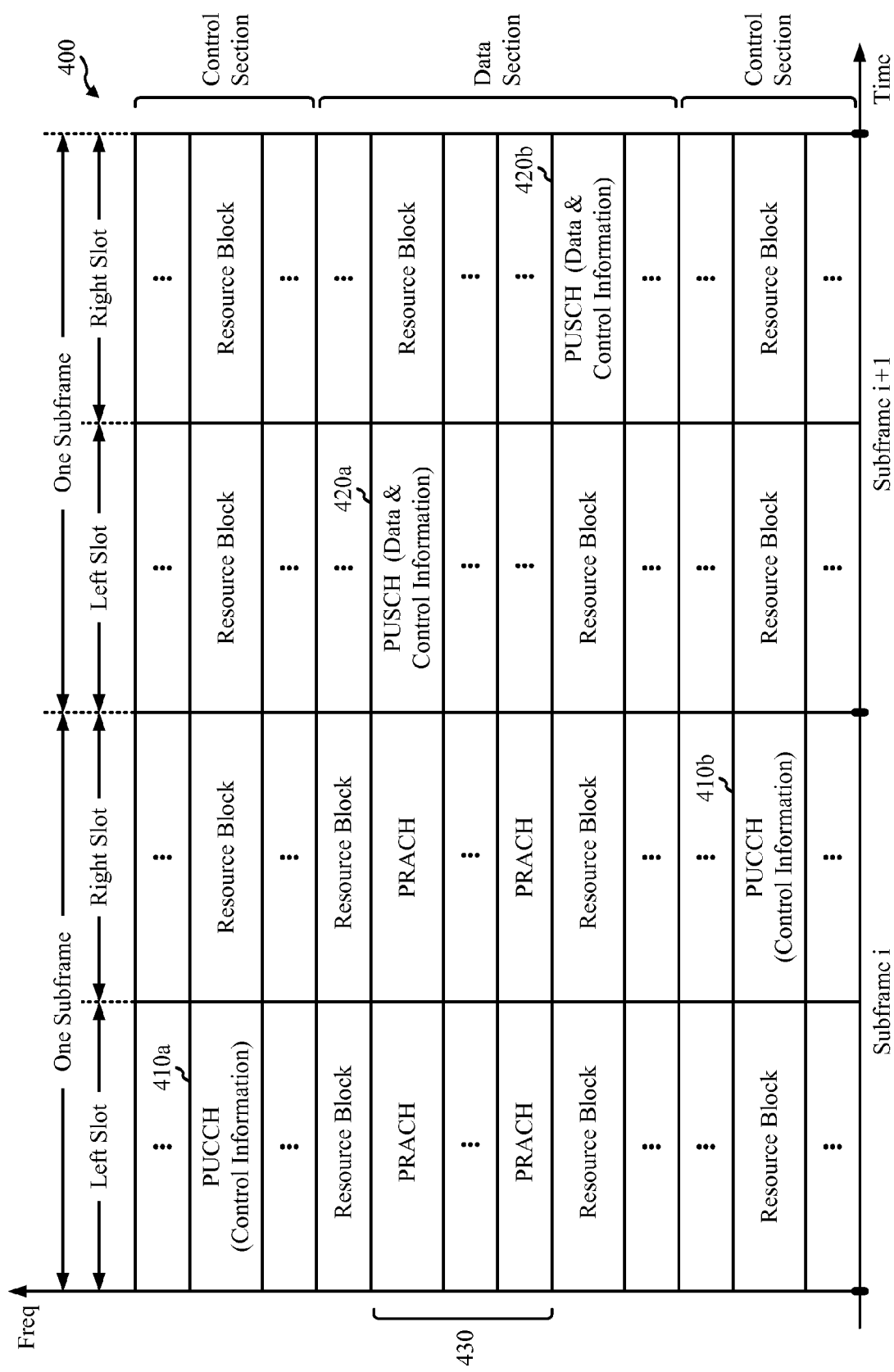
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
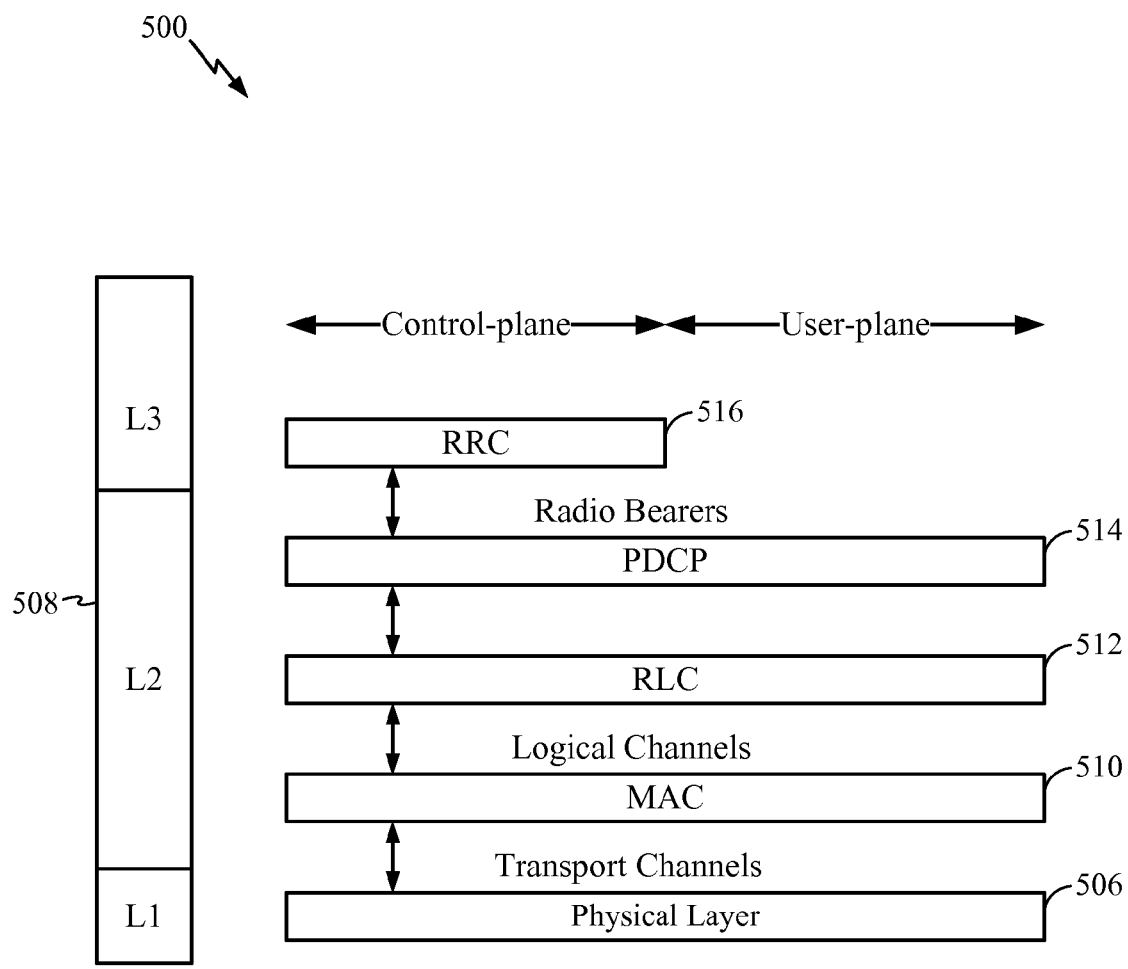
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
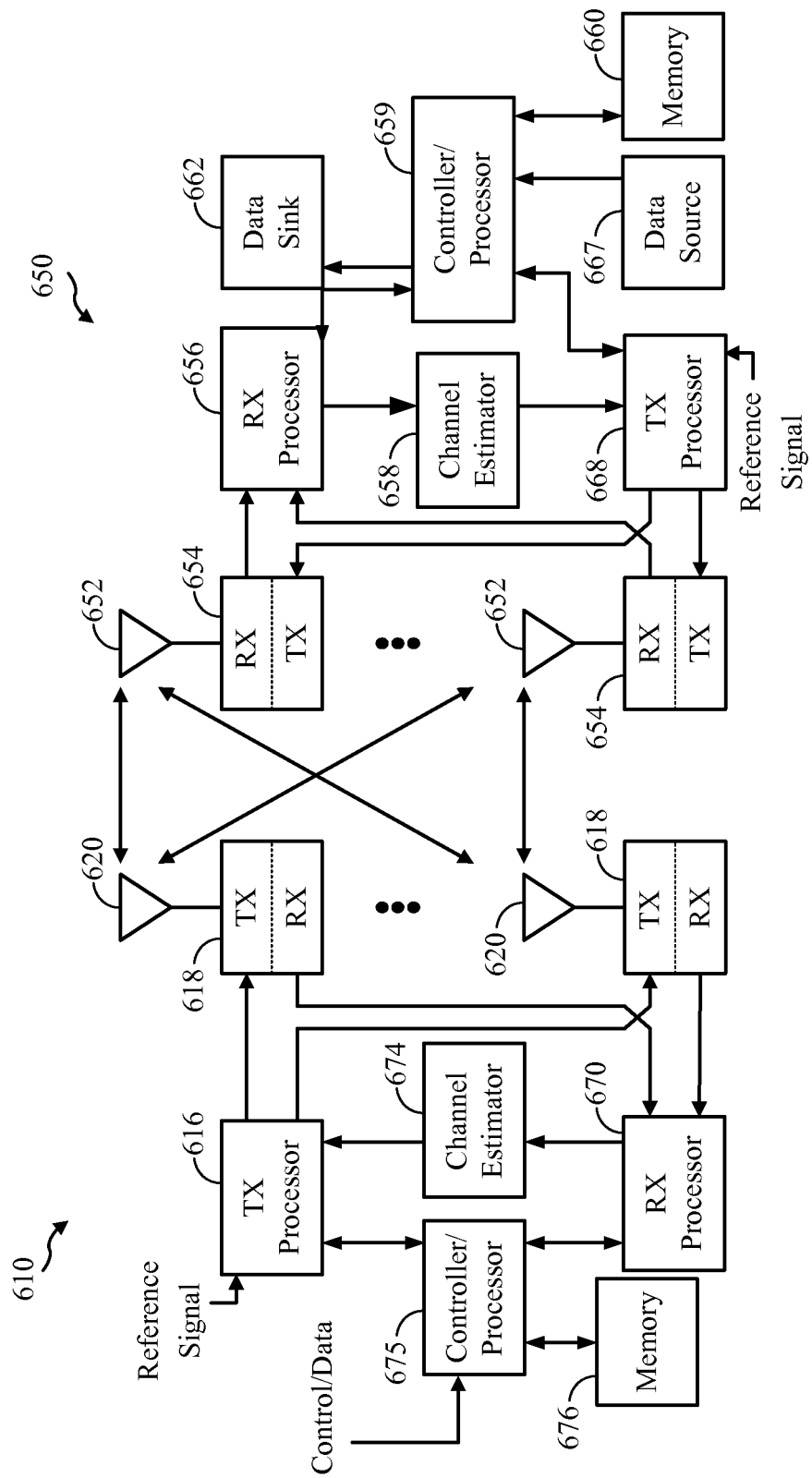
FIG. 6 is a diagram illustrating an example of an evolved Node B and user equipment in an access network, in accordance with certain aspects of the disclosure.

FIG. 6 is a block diagram of an example eNB 610 in communication with a UE 650 in an access network.

For downlink transmissions, from the eNB 610 to the UE 650, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610.

These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

According to certain aspects, channel estimation may be performed by aligning channel impulse responses (CIR) obtained with de-staggering disabled may be aligned with CIR obtained with de-staggering enabled. Performance benefits may be achieved, by avoiding the use of stale estimates (e.g., from previous DL subframes) and not having to wait until de-staggered CIR is available. This may also allow for re-use of hardware design, allowing non-destaggered CIR with a same channel tap length as de-staggered CIR.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Example Frame Structure

Figure 7:
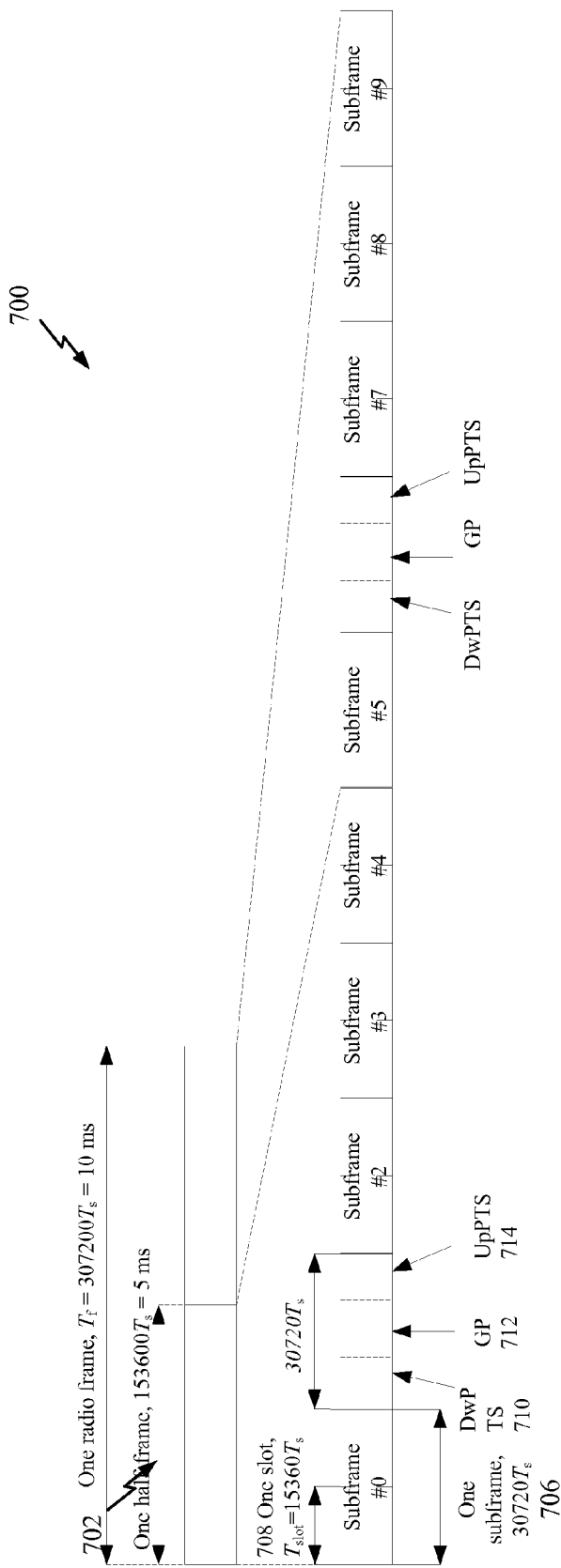
FIG. 7 is a block diagram conceptually illustrating an example of a frame structure in a telecommunications system in accordance with certain aspects of the present disclosure.

FIG. 7 shows a frame structure 700 for a Time Division Duplex Long Term Evolution (TDD-LTE) carrier. The TDD-LTE carrier, as illustrated, has a frame 702 that is 10 ms in length. The frame 402 has two 5 ms half frames 704, and each of the half frames 704 includes five 1 ms subframes 706. Each subframe 706 may be a downlink subframe (D), an uplink subframe (U), or a special subframe (S). Downlink subframes and uplink subframes may be divided into two 0.5 ms slots 708. Special subframes may be divided into a downlink pilot time slot (DwPTS) 710, a guard period (GP) 712, and an uplink pilot time slot (UpPTS) 714 to support a downlink subframe to uplink subframe switch. Depending on the configuration, the duration of DwPTS, UpPTS, and GP may vary, as illustrated in FIG. 9.

Figure 8:
FIG. 8 illustrates an example list of downlink/uplink (DL/UL) configurations in a frame in the TDD-LTE standard in accordance with certain aspects of the present disclosure.

FIG. 8 illustrates an example list of the downlink/uplink configurations in a TDD-LTE frame 702 according to the LTE standard. In this table D, U, and S indicate Downlink, Uplink and Special subframes 706, respectively. As illustrated, the special subframe S may consist of DwPTS 710, GP 712, and UpPTS 714 fields.

As illustrated, several DL/UL configurations for 5 ms switch point periodicity and 10 ms switch point periodicity may be chosen for a TDD-LTE frame. The configurations 0, 1, and 2 have two identical 5 ms half-frames 704 within a 10 ms TDD-LTE frame 702. Subframes 0 and 5 and DwPTS may always be downlink. UpPTS and the subframe after a special subframe may always be uplink.

Figure 9:
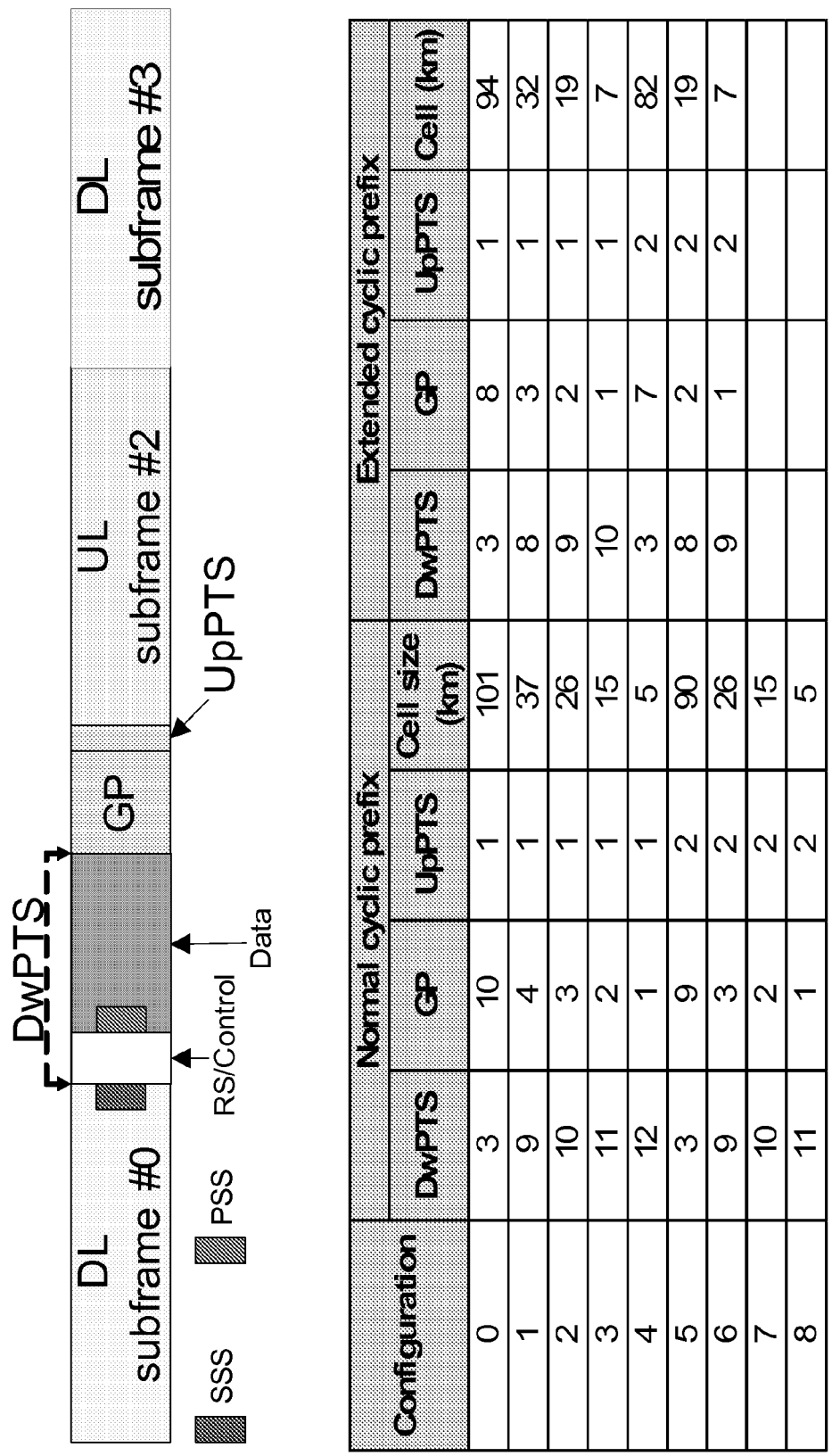
FIG. 9 illustrates an example list of DwPTS/UpPTS configurations in a special subframe according to the LTE standard.

FIG. 9 illustrates an example list of DwPTS/UpPTS configurations in a special subframe according to the LTE standard. The table lists nine example variations of DwPTS and UpPTS lengths, in symbols. However, the total length of DwPTS, GP, and UpPTS in each configuration may be equal to one subframe.

For DL subframes that follow an UL subframe (referred to herein as "uDL" subframes), the previous DL subframe may be several subframes prior. As a result, there may be edge conditions for a downlink subframe after an uplink subframe (a uDL subframe), and a DwPTS in a special subframe, as will be further described below.

Example Channel Estimation in Wireless Networks

Figure 10:
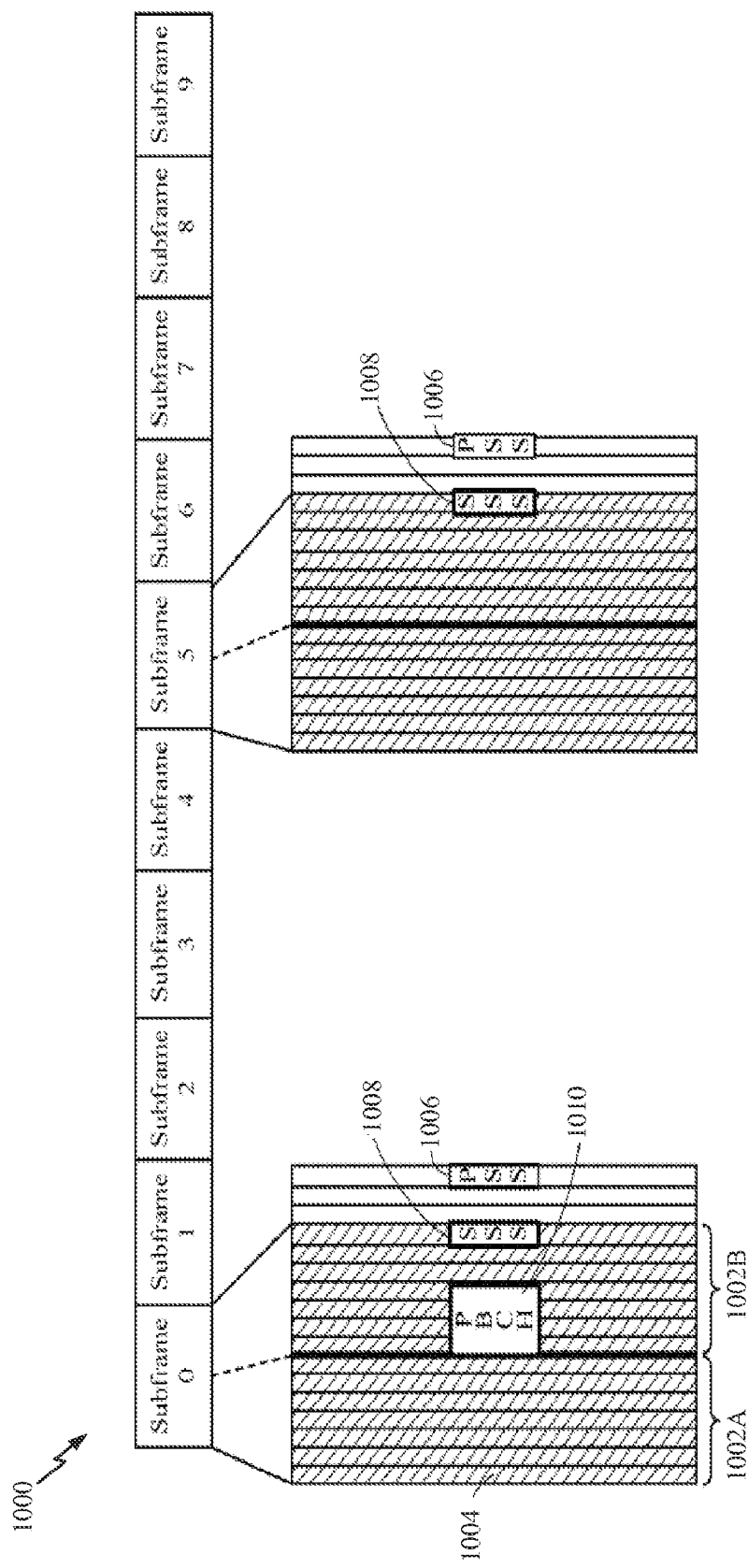
FIG. 10 illustrates an embodiment of an LTE frame with overhead signals in accordance with certain aspects of the present disclosure.

FIG. 10 illustrates example locations of overhead signals in an exemplary LTE frame 1000. As illustrated, LTE frame 1000 may be divided into subframes 0-9, with each subframe further divided (in time) into two slots 1002A and 1002B. Numbering slots from 0 and starting with Subframe 0, the second slot of Subframe 0 may be referred to as Slot 1, while the second slot of Subframe 5 may be referred to as Slot 11.

As illustrated, each slot may be further divided into symbols 1004. To acquire service in a TDD-LTE system, a UE may need to first detect a Primary Synchronization Signal (PSS) 1006, a Secondary Synchronization Signal (SSS) 1008, and a Physical Broadcast Channel (PBCH) 1010 of the TDD-LTE system.

As illustrated these overhead signals may occupy the center 1.08 MHz (i.e., 6 resource blocks) of the transmission bandwidth. As illustrated, PSS may be transmitted in the third symbol of subframes 1 and 6 and may be used to identify a cell index (0, 1, 2) and subframe timing. SSS 1008, which may be used to identify the cell identification (ID) group index (0, 1, . . . , 167) and frame timing, may be transmitted in the last symbol in slots 1 and 11.

PBCH 1010 may always be transmitted in the second slot of Subframe 0 (Slot 1). PBCH 1010 may provide a variety of system information needed by the UE to communicate in the TDD LTE system, such as an overall DL transmission bandwidth, a physical hybrid ARQ indicator channel (PHICH) configuration, and a System Frame Number (SFN).

To allow measurement on a TDD-LTE cell, in addition to acquiring PSS 1006, SSS 1008, and PBCH 1010, a UE may need to detect and measure a Reference Signal (RS) to perform channel estimation. In some cases, to perform channel estimation, the UE may need to obtain measurements of DL transmissions from the TDD-LTE cell in Slot 1 and the first 3 symbols of Subframe 1, which may correspond to time interval 0.5~1.43 ms of the TDD-LTE frame 1000. Further, the UE may also need to obtain measurements in Slot 11 and the first three symbols of subframe 6, which may correspond to time interval 5.92~6.43 ms of the TDD-LTE frame 1000.

The UE may measure the RS in any given slot. However, there may be edge conditions for a downlink subframe after an uplink subframe (uDL), and a DwPTS in a special subframe. Such edge conditions may lead to poor channel estimation which, in turn, may impact system performance.

Referring back to FIG. 8, the edge conditions may be present in an uplink-centric configuration, with multiple UL subframes, such as uplink-downlink configuration 0. In FDD systems, a UE may have continuous downlink subframes containing cell-specific reference signal (CRS) tones with regular patterns in frequency and time domain. Therefore, with continuous downlink subframes, the UE may have no issues performing channel estimation (except for MBSFN transmissions).

However, in TDD systems, a UE may not have continuous downlink subframes for measuring RSs and performing channel estimation. For example, in an uplink-centric subframe configuration 0, during uplink subframes 2, 3, and 4, the UE may not receive reference signals from a base station. During this relatively long period, conditions for the UE may have changed, such as a mobility characteristic of the UE (e.g., Doppler estimation) or its proximity to the serving base station.

As a result, TDD channel impulse response (CIR) estimation may have to avoid uplink corruption and account for channel decorrelation through the uplink subframes. Certain aspects of the present disclosure provide techniques for leveraging an LTE FDD CRS channel estimation design and implementation for simplifying overall system complexity for performing channel estimation in a TDD-LTE system.

Figure 11:
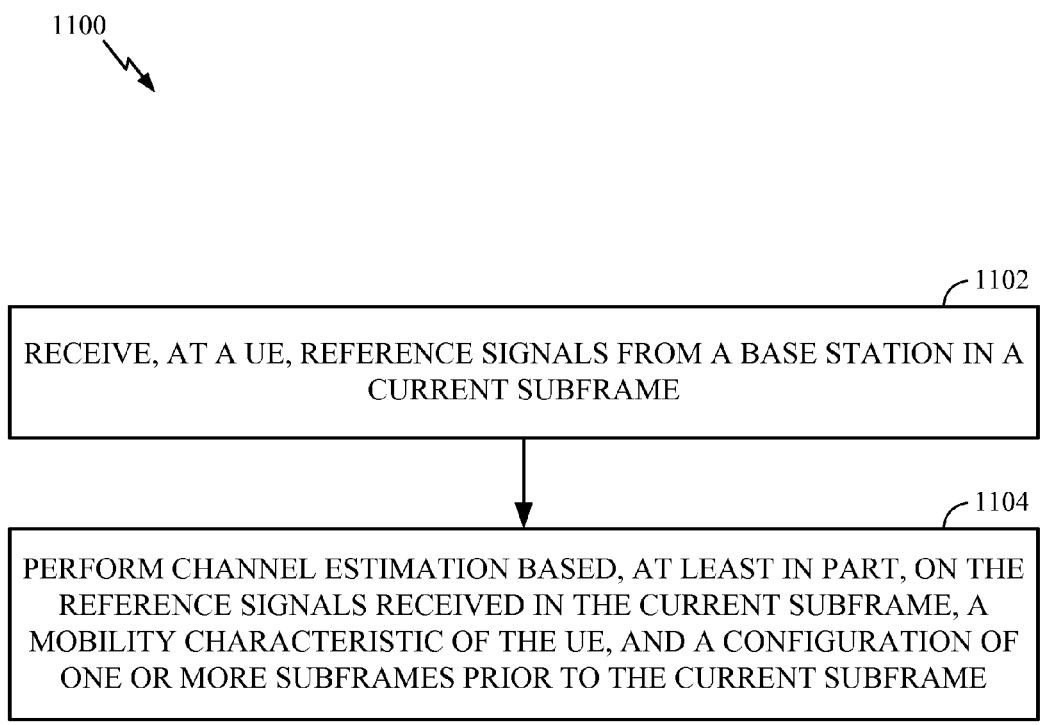
FIG. 11 illustrates example operations for performing channel estimation in a TDD-LTE system, in accordance with certain aspects of the present disclosure.

FIG. 11 illustrates example operations 1100 for performing channel estimation in a TDD-LTE system, in accordance with certain aspects of the present disclosure. The operations 1100 may be performed, for example, by a UE.

At 1102, the UE may receive reference signals from a base station in a current subframe. At 1104, the UE may perform channel estimation based, at least in part, on the reference signals received in the current subframe, a mobility characteristic of the UE (e.g., a Doppler estimation of the UE), and a configuration of subframes prior to the current subframe. For certain aspects, subframes prior to the current DL subframe may include subframes in which transmission of downlink reference signals is limited or non-existent (e.g., uplink subframes 2, 3, and 4 in configuration 0 illustrated in FIG. 8).

Performing the channel estimation may include adjusting the Doppler estimation of the UE based, at least in part, on a number of subframes prior to the current subframe in which transmission of downlink reference signals is limited or non-existent. If the adjusted Doppler estimation of the UE is less than a threshold value, the channel estimation may be based, at least in part, on reference signals received in one or more previous downlink subframes. However, if the adjusted Doppler estimation of the UE is greater than the threshold value, the channel estimation may be performed based on reference signals received in the current subframe only. For certain aspects, the channel estimation may be based at least in part on reference signals received in one or more previous downlink subframes only if the UE is operating in a high current mode in which continuity of phase between subframes is maintained.

In order to improve system performance of a UE in a TDD-LTE system while performing channel estimation, the UE may model channel decorrelation due to uplink interruption as a function of mobility characteristics of the UE (e.g., a Doppler estimation of the UE that indicates how fast the UE is moving), and the TDD uplink/downlink and special subframe configurations (e.g., as shown FIGS. 8 and 9).

In other words, the Doppler estimation of the UE and the subframe configuration may be considered together while performing channel estimation. When performing channel estimation in a current subframe n, the UE may consider a combination of reference signals received in the current subframe n and at least one previous subframe (n−1), according to a factor α:

$$y(n) = \alpha \times x(n) + (1-\alpha) \times x(n-1), \text{ with } 0 \le \alpha \le 1.$$

where $x(n)$ and $x(n-1)$ represent the reference signal received. Therefore, if reference signals from previous subframes are not to be considered, α may be set to 1. On the other hand, if reference signals from the current subframe are not to be considered (and only historical values are considered), α may be set to 0.

According to certain aspects, the UE may freeze infinite impulse response (IIR) filtering by using a zero coefficient for RS symbols in the guard period and UpPTS of special subframes, uplink subframes, and the first RS symbol in a DL subframe following an UL subframe (a uDL subframe). In this manner, non-downlink subframes may be skipped in order not to corrupt downlink channel estimation. For the second RS symbol in uDL subframes, the UE may perform Doppler advancing for IIR table lookup. For certain aspects, the UE may adjust the Doppler estimation of the UE based, at least in part, on a number of DL subframes prior to the current DL subframe in which transmission of downlink reference signals is limited or non-existent:

$$\text{DopplerEstimate\_DA} = f(\text{DopplerEstimate}, (\text{\# of missing CRS symbols since last DL})).$$

In other words, the factor α described above may be determined according to the Doppler estimation of the UE. If the Doppler estimation is less than a threshold value (e.g., corresponding to a value used for IIR table lookup), the channel estimation may be based at least in part on reference signals received in one or more previous downlink subframes (i.e., α<1). In some cases, effective channel phase may evolve across subframes naturally in spite of UL/DL switching.

Effective channel may include at least the eNB TX and the UE RX all maintaining phase continuity. The radio transmitter receiver (RTR) may allow for a high current mode in which continuity of phase between subframes is maintained. Specifications for the eNB may enforce DL phase continuity.

However, if the Doppler estimation is greater than the threshold value, the channel estimation may be based on reference signals received in the current subframe only (i.e., $\alpha=1$; effectively resulting in a soft reset with no previous RS considered), to account for a potentially discontinuous phase during UL/DL switching. This may be due to channel decorrelation or when the eNB/UE may not be able to guarantee a continuous phase during switching. In some cases, the RTR may allow a low current mode that may not preserve phase. In some cases, a column may be added to (e.g., at the end of) a coefficient lookup table (LUT) with 1.0 to naturally combine soft reset and Doppler advancing as a function of Doppler.

According to certain aspects, a group delay may be utilized for skipping any invalid channel estimation, even while in a downlink subframe (e.g., uDL). For example, the UE may take action to ensure not to use the first RS symbol in a uDL subframe for control and data demodulation, as this first RS symbol may be stale. As an example, the UE may use a group delay by waiting for at least four symbols where the first valid channel estimate becomes available, or waiting for the group delay determined from the coherent filtering of the channel estimation, whichever is greater.

Moreover, in some cases, the UE may disable TD slot averaging of noise if the previous slot is an UL slot. According to certain aspects, the UE may enable noise estimation for special subframes by using any available RS symbols. For radio link monitoring (RLM), the UE may only use RS1 of uDL as RS0 in uDL may be stale.

Figure 12:
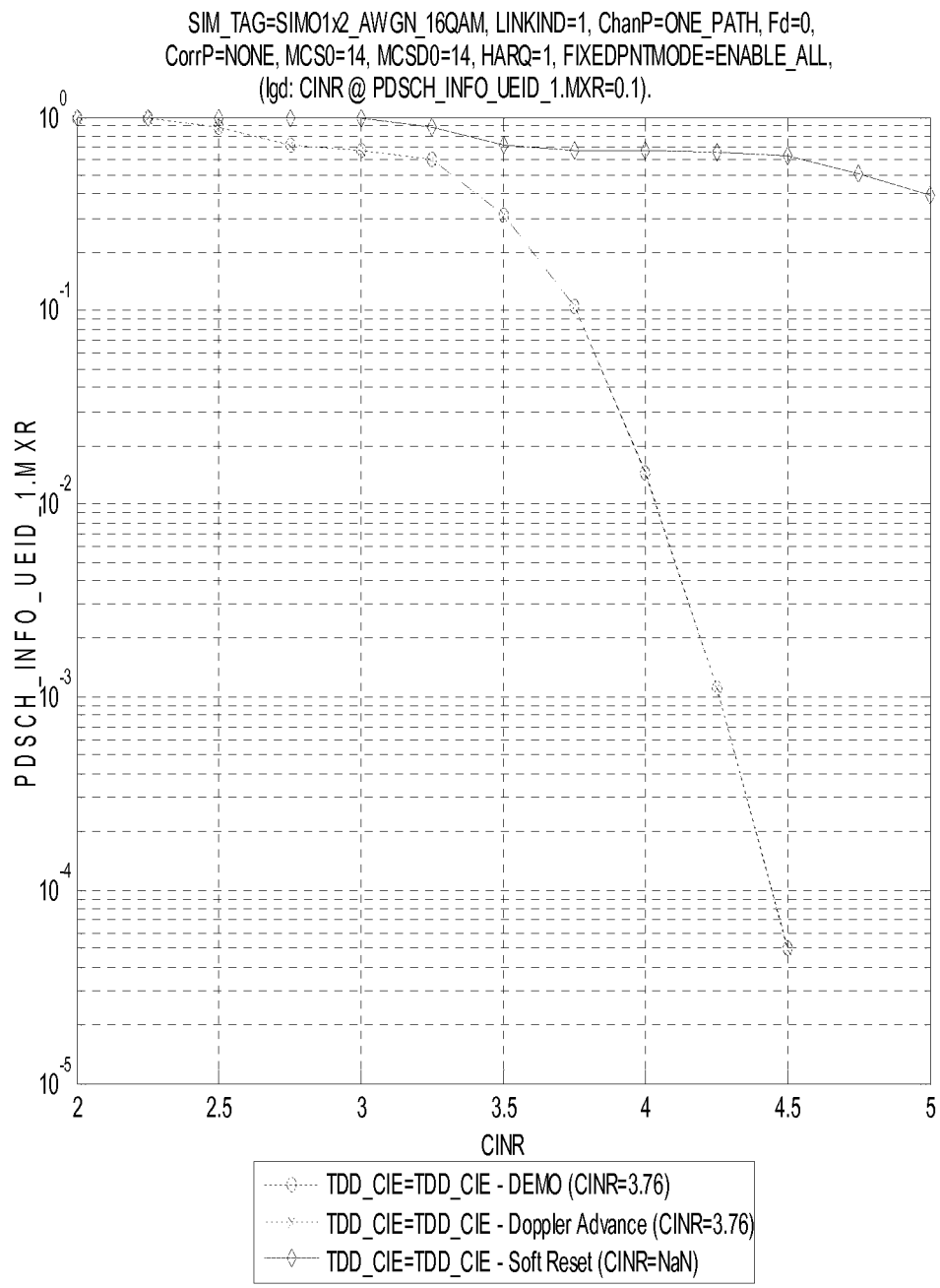
FIGS. 12-14 illustrate scenarios where a UE may choose between a soft reset and Doppler advance while performing channel estimation, in accordance with certain aspects of the present disclosure.
Figure 13:
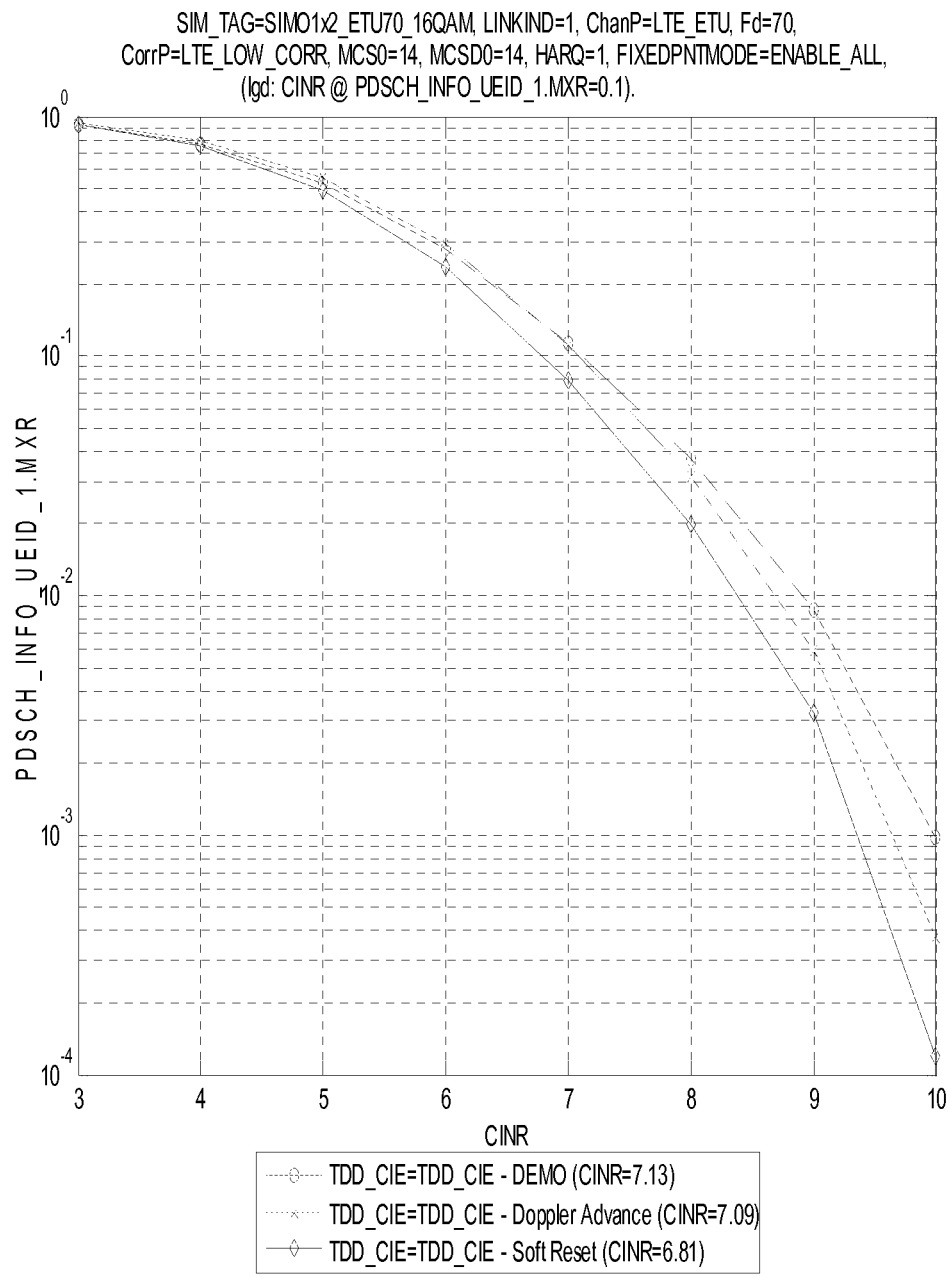
Figure 14:
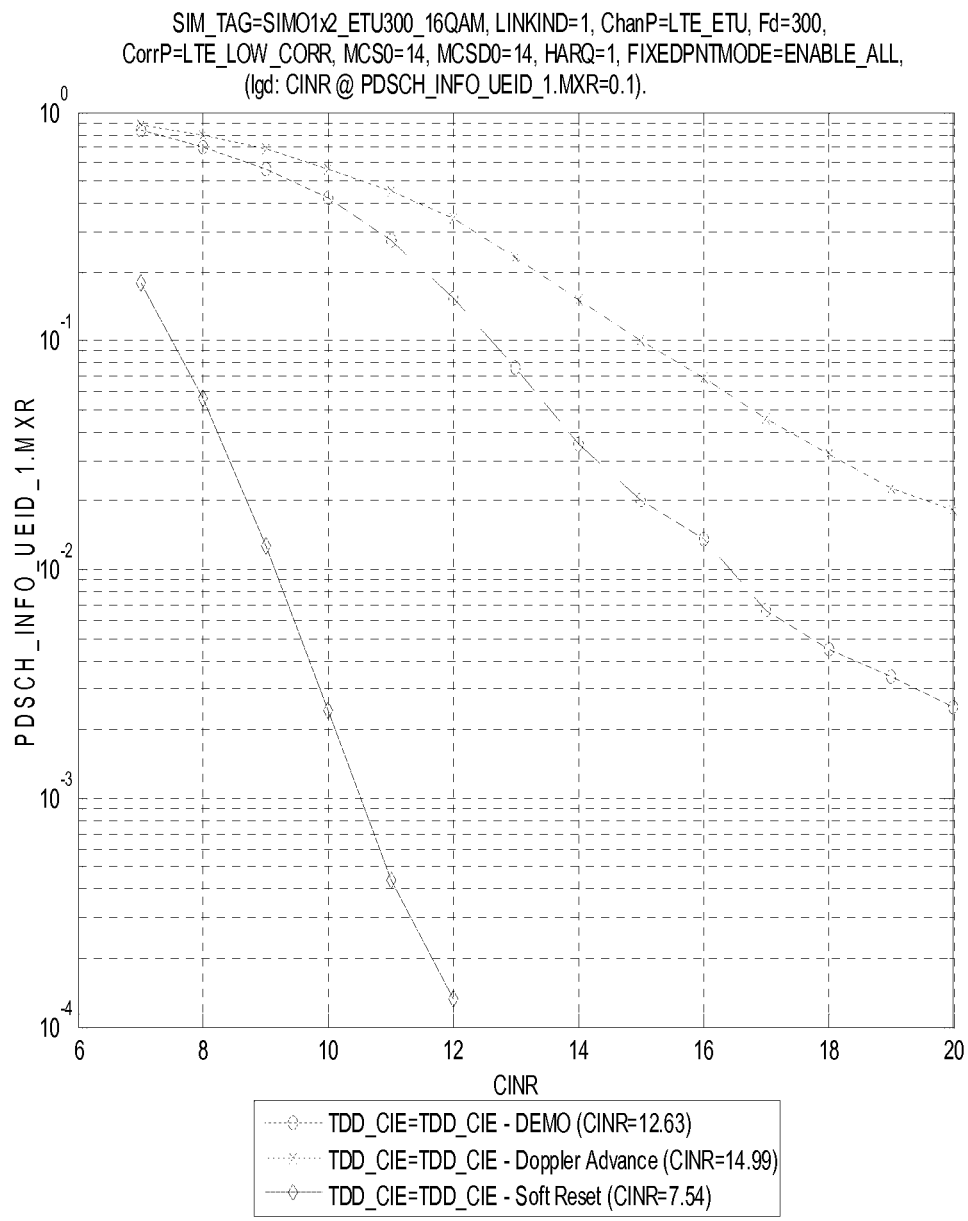

FIGS. 12-14 illustrates scenarios where a UE may choose between a soft reset and Doppler advance (e.g., considering reference signals from previous subframes) while performing channel estimation to achieve the lowest message erasure rate (MXR), in accordance with certain aspects of the present disclosure. In these figures, the curves labeled with "DEMO" are obtained using a fixed IIR $\alpha$ coefficient to illustrate that performance can be optimized using a varying IIR coefficient as a function of channel condition, in particular, the Doppler frequency.

LTE TDD channel estimation presented herein may leverage current FDD design and implementation to simplify system complexity. However, unlike FDD, which may have continuous downlink subframes with pilots for channel estimation update, TDD encounters UL interruption as a function of the TDD ULDL configuration. Therefore, aspects of the present disclosure may provide techniques that can be implemented with current LTE systems for improved channel estimation performance, particularly, in TDD mode It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

As used herein, a phrase referring to "at least one of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communications, comprising:
   receiving, at a user equipment (UE), reference signals from a base station in a current subframe; and
   performing channel estimation, wherein the channel estimation is based at least in part on the reference signals received in the current subframe, a Doppler estimation of the UE, and a configuration of subframes prior to the current subframe, wherein the Doppler estimation is adjusted based at least in part on a number of subframes prior to the current subframe in which transmission of downlink reference signals is limited or non-existent.

2. The method of claim 1, wherein subframes prior to the current subframe comprise subframes in which transmission of downlink reference signals is limited or non-existent.

3. The method of claim 2, wherein the performing the channel estimation comprises:
   using a zero coefficient for reference signal symbols in the subframes in which transmission of the downlink reference signals is limited or non-existent.

4. The method of claim 1, wherein if the adjusted Doppler estimation of the UE is less than a threshold value, the channel estimation is performed based at least in part on reference signals received in one or more previous downlink subframes.

5. The method of claim 1, wherein if the adjusted Doppler estimation of the UE is greater than a threshold value, the channel estimation is performed based on reference signals received in the current subframe only.

6. A method for wireless communications, comprising:
   receiving, at a user equipment (UE), reference signals from a base station in a current subframe; and
   performing channel estimation, wherein the channel estimation is based at least in part on the reference signals received in the current subframe, a mobility characteristic of the UE, and a configuration of subframes prior to the current subframe, wherein the channel estimation is based at least in part on reference signals received in one or more previous downlink subframes only if the UE is operating in a high current mode in which continuity of phase between subframes is maintained.

7. A method for wireless communications, comprising:
   receiving, at a user equipment (UE), reference signals from a base station in a current subframe; and
   performing channel estimation, wherein the channel estimation is based at least in part on the reference signals received in the current subframe, a mobility characteristic of the UE, and a configuration of subframes prior to the current subframe, wherein the performing the channel estimation comprises:

using a group delay to skip at least a first reference signal symbol in the current subframe.

8. An apparatus for wireless communications, comprising:
means for receiving, at a user equipment (UE), reference signals from a base station in a current subframe; and
means for performing channel estimation, wherein the channel estimation is based at least in part on the reference signals received in the current subframe, a Doppler estimation of the UE, and a configuration of subframes prior to the current subframe, wherein the Doppler estimation is adjusted based at least in part on a number of subframes prior to the current subframe in which transmission of downlink reference signals is limited or non-existent.

9. The apparatus of claim 8, wherein subframes prior to the current subframe comprise subframes in which transmission of downlink reference signals is limited or non-existent.

10. The apparatus of claim 9, wherein the means for performing the channel estimation comprises:
means for using a zero coefficient for reference signal symbols in the subframes in which transmission of the downlink reference signals is limited or non-existent.

11. The apparatus of claim 8, wherein if the adjusted Doppler estimation of the UE is less than a threshold value, the channel estimation is performed based at least in part on reference signals received in one or more previous downlink subframes.

12. The apparatus of claim 8, wherein if the adjusted Doppler estimation of the UE is greater than a threshold value, the channel estimation is performed based on reference signals received in the current subframe only.

13. An apparatus for wireless communications, comprising:
means for receiving, at a user equipment (UE), reference signals from a base station in a current subframe; and
means for performing channel estimation, wherein the channel estimation is based at least in part on the reference signals received in the current subframe, a mobility characteristic of the UE, and a configuration of subframes prior to the current subframe, wherein the channel estimation is based at least in part on reference signals received in one or more previous downlink subframes only if the UE is operating in a high current mode in which continuity of phase between subframes is maintained.

14. An apparatus for wireless communications, comprising:
means for receiving, at a user equipment (UE), reference signals from a base station in a current subframe; and
means for performing channel estimation, wherein the channel estimation is based at least in part on the reference signals received in the current subframe, a mobility characteristic of the UE, and a configuration of subframes prior to the current subframe, wherein the means for performing the channel estimation comprises:
means for using a group delay to skip at least a first reference signal symbol in the current subframe.

15. An apparatus for wireless communications, comprising:
at least one processor configured to:
receive, at a user equipment (UE), reference signals from a base station in a current subframe; and
perform channel estimation, wherein the channel estimation is based at least in part on the reference signals received in the current subframe, a Doppler estimation of the UE, and a configuration of subframes prior to the current subframe, wherein the Doppler estimation is adjusted based at least in part on a number of subframes prior to the current subframe in which transmission of downlink reference signals is limited or non-existent; and
a memory coupled to the at least one processor.

16. The apparatus of claim 15, wherein subframes prior to the current subframe comprise subframes in which transmission of downlink reference signals is limited or non-existent.

17. The apparatus of claim 16, wherein performing the channel estimation comprises:
using a zero coefficient for reference signal symbols in the subframes in which transmission of the downlink reference signals is limited or non-existent.

18. The apparatus of claim 15, wherein if the adjusted Doppler estimation of the UE is less than a threshold value, the channel estimation is performed based at least in part on reference signals received in one or more previous downlink subframes.

19. The apparatus of claim 15, wherein if the adjusted Doppler estimation of the UE is greater than a threshold value, the channel estimation is performed based on reference signals received in the current subframe only.

20. An apparatus for wireless communications, comprising:
at least one processor configured to:
receive, at a user equipment (UE), reference signals from a base station in a current subframe; and
perform channel estimation, wherein the channel estimation is based at least in part on the reference signals received in the current subframe, a mobility characteristic of the UE, and a configuration of subframes prior to the current subframe, wherein the channel estimation is based at least in part on reference signals received in one or more previous downlink subframes only if the UE is operating in a high current mode in which continuity of phase between subframes is maintained; and
a memory coupled to the at least one processor.

21. An apparatus for wireless communications, comprising:
at least one processor configured to:
receive, at a user equipment (UE), reference signals from a base station in a current subframe; and
perform channel estimation, wherein the channel estimation is based at least in part on the reference signals received in the current subframe, a mobility characteristic of the UE, and a configuration of subframes prior to the current subframe, wherein performing channel estimation comprises:
using a group delay to skip at least a first reference signal symbol in the current subframe; and
a memory coupled to the at least one processor.

22. A computer-program product for wireless communications, the computer-program product comprising:
a non-transitory computer-readable medium having code for:
receiving, at a user equipment (UE), reference signals from a base station in a current subframe; and
performing channel estimation, wherein the channel estimation is based at least in part on the reference signals received in the current subframe, a Doppler estimation of the UE, and a configuration of subframes prior to the current subframe, wherein the Doppler estimation is adjusted based at least in part on a number of subframes prior to the current subframe in which transmission of downlink reference signals is limited or non-existent.

23. The computer-program product of claim 22, wherein subframes prior to the current subframe comprise subframes in which transmission of downlink reference signals is limited or non-existent.

24. The computer-program product of claim 23, wherein the code for performing the channel estimation comprises:
   code for using a zero coefficient for reference signal symbols in the subframes in which transmission of the downlink reference signals is limited or non-existent.

25. The computer-program product of claim 22, wherein if the adjusted Doppler estimation of the UE is less than a threshold value, the channel estimation is performed based at least in part on reference signals received in one or more previous downlink subframes.

26. The computer-program product of claim 22, wherein if the adjusted Doppler estimation of the UE is greater than a threshold value, the channel estimation is performed based on reference signals received in the current subframe only.

27. A computer-program product for wireless communications, the computer-program product comprising:
   a non-transitory computer-readable medium having code for:
   receiving, at a user equipment (UE), reference signals from a base station in a current subframe; and
   performing channel estimation, wherein the channel estimation is based at least in part on the reference signals received in the current subframe, a mobility characteristic of the UE, and a configuration of subframes prior to the current subframe, wherein the channel estimation is based at least in part on reference signals received in one or more previous downlink subframes only if the UE is operating in a high current mode in which continuity of phase between subframes is maintained.

28. A computer-program product for wireless communications, the computer-program product comprising:
   a non-transitory computer-readable medium having code for:
   receiving, at a user equipment (UE), reference signals from a base station in a current subframe; and
   performing channel estimation, wherein the channel estimation is based at least in part on the reference signals received in the current subframe, a mobility characteristic of the UE, and a configuration of subframes prior to the current subframe, wherein the code for performing the channel estimation comprises:
   code for using a group delay to skip at least a first reference signal symbol in the current subframe.

* * * * *